United States Patent Office 3,119,021
Patented Jan. 21, 1964

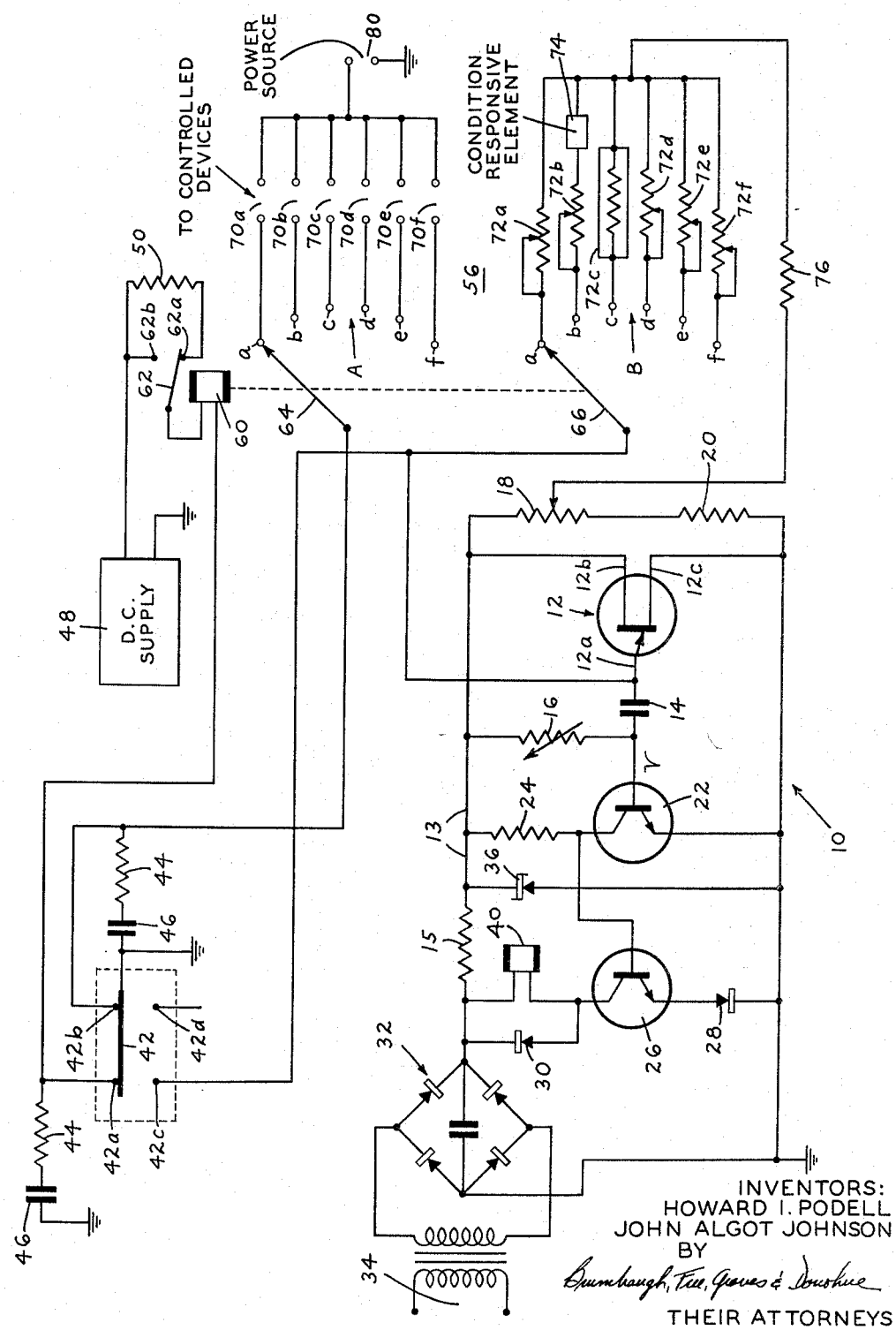

3,119,021
VARIABLE TIME DELAY SEQUENCING ARRANGEMENT
Howard I. Podell, 6 Dawes Place, Larchmont, N.Y., and John Algot Johnson, 9 Sheridan Drive, Short Hills, N.J.
Filed Oct. 1, 1962, Ser. No. 227,169
17 Claims. (Cl. 307—39)

This invention relates to sequential electrical timing or programming circuits, and more particularly to an improved sequential timing circuit utilizing solid state timing networks.

For effective automatic control of multi-step manufacturing processes, it is necessary to regulate the sequence and time duration of the individual steps of the process with a high degree of accuracy, flexibility, and control. It is common practice to use clock-type timers or electronic timing devices for this purpose, providing a separate unit to control each step of the process. In a complex process having a large number of individual steps, such timing systems become cumbersome and uneconomical, not only because of the large number of individual timing units necessary but also because of the installation and maintenance problems which are presented. Furthermore, the possibility of error increases in proportion to the number of individual timing units necessary.

Mechanical sequence controls, such as motor driven commutator arrangements are available. However, devices of this type are neither accuate enough for many purposes, nor are they sufficiently flexible to enable the simple and rapid adjustment of time intervals required to make their use practical.

Tests have been made in the past to adapt the inherent flexibility of electronic circuits to sequencing controls, however, no truly practical and sufficiently versatile arrangements have come to the attention of the present inventors. One form of such prior art devices utilizes a thyratron tube having its firing times controlled by a resistance-capacitance network. As a result of the thyratron characteristic, additional circuitry is necessary to extinguish the tube during each cycle. This not only renders the circuit complex and expensive, but also tends to make the timing cycles produced inaccurate and difficult to control.

Various other forms of electronic and combined electronic and mechanical arrangements have been devised, but in each case they have been found to be unduly complex (and therefore economically impractical) and lacking in accuracy and flexibility.

Accordingly, the primary object of the present invention is to provide improved means for establishing a predetermined sequence of control functions.

A further object of this invention is to provide improved electrical timing circuits capable of a wide range of individual and overall adjustment and suitable for use with industrial process controls or the like.

Still another object of this invention is to provide a simplified timing control arrangement for enabling a plurality of control functions to be performed in a predetermined sequence.

Yet another object of this invention is to provide improved process sequence control arrangements wherein the time duration of individual control functions may be adjusted during operation of the device.

In accordance with the invention, a multi-position switching means, such as a stepping switch, is employed to establish the desired sequence of control functions. A source of power for the devices to be controlled is connected through the switching device to apply operating power in sesquential fashion to the devices being controlled. A controllable free running pulse source of the solid state type, having a variable impedance network to control the time duration between pulses, operates to advance the switching means and connect the controlled devices to the power source in the desired sequence.

The switching means also connects respective ones of a plurality of timing impedances into the circuit of the pulse source to establish the pulse spacing thereof each time the switching means advances. Therefore, at the same time that an output pulse from the pulse source serves to couple the power source to a device to be controlled, it operates the switching means to select an impedance element to establish the time of the next pulse therefrom and consequently, the length of time that the particular controlled device is to be operated. The variable impedances, which may for example be the resistor or capacitor of a resistance-capacitance timing network, can be readily controlled to establish a wide range of operation times, or can be adjusted to provide substantially "zero" time, thereby effectively eliminating the particular step of the process. Additional timing controls can be superimposed upon the basic adjustable impedance to make the arrangement responsive to such conditions as temperature, humidity, and pressure. In addition, an overall timing control is provided which serves to similarly adjust the timing of all of the individual timing networks.

The foregoing and other objects, features and advantages of the present invention will become apparent from the following more detailed description thereof, when taken in conjunction with the accompanying drawing, the single figure of which illustrates the circuit of the invention.

Referring now to the drawing, the numeral 10 indicates generally a free running solid state pulse generator capable of producing a series of relatively short duration, high power pulses, whose spacing is determined by the parameters of an impedance network associated therewith. As shown, this impedance network includes a capacitance 14 and the resistances associated with contact bank B of a stepping switch indicated generally at 56. The pulse output of the generator 10 actuates a relay coil 40 and its associated armature 42 to operate the coil 60 of the stepping switch, once for each pulse. Operation of the latter serves, through contact bank A, to connect the devices to be controlled to the power source and also to connect the time determining element into the pulse generator circuit via contact bank B for establishing the duration of the operation performed by the controlled device.

The solid state timing circuit illustrated includes a semiconductor device 12, of the type known as the unijunction transistor, having an emitter electrode 12a and two base electrodes 12b and 12c respectively. The base electrode 12c is connected directly to ground while electrode 12b is connected to a D.C. supply bus 13 and through potentiometer 18 and resistor 20 to ground.

The emitter electrode 12a is connected via a capacitor 14 to the base of a transistor 22, which may be of the NPN type, connected in the common emitter configuration. The emitter of the transistor 22 is coupled directly to ground while a load resistor 24 couples the collector element to the D.C. bus 13. A variable resistor 16 couples the D.C. voltage bus 13 to the base of the transistor 22 to supply biasing potential thereto.

The output of the transistor 22 is in turn coupled from its collector to the base of a second transistor 26 which may also be of the NPN type in the common emitter configuration. The emitter of the transistor 26 is coupled through a diode 28 to ground and the collector load impedance is provided by the relay coil 40 coupling the collector of the transistor 26 to the D.C. voltage source 32. A diode 30 is connected in parallel across the coil 40. Diode 28 serves to maintain transistor 26 normally nonconducting, while diode 30 protects the circuit from inductive voltage transients caused by operation of the relay coil 40.

The D.C. source 32 is a conventional rectifying circuit providing suitable D.C. operation potentials from the A.C. input applied to it at 34. These potentials are coupled through dropping resistor 15 to the supply bus 13. A zener diode 36 is coupled between the D.C. voltage bus 13 and ground to maintain the power supply voltage substantially constant.

The armature 42 associated with relay coil 40 moves between the first position (when the coil is not operated) bridging the contacts 42a and 42b and connecting them to ground, and a second position (when the coil 40 is actuated) bridging the contacts 42c and 42d. The contact 42a is coupled to one terminal of the coil 60 of the stepping switch 56, the other terminal of which coil is coupled to the armature 62 thereof. The armature 62 moves between a pair of contacts 62a and 62b, connected directly and through resistor 50, respectively, to a suitable D.C. supply 48.

The contact 42b is connected directly to the switch arm 64 associated with a first bank of contacts A on the stepping switch 56. Six contacts, a–f, have been shown for illustrative purposes, however, it will be realized that any number of contacts, larger or smaller, may be used as desired. Connected between each of the contacts a–f and a power source 80 is a corresponding pair of terminals, 70a–70f to which the devices to be controlled are connected. The controlled devices may be of any type requiring electrical power, such as solenoid-operated valves, motors, relays, etc. The power source 80 may be of any suitable type to provide the energy requirements necessary for operation of the controlled devices.

Each of contacts 42a and 42b is connected to ground through respective series resistance-capacitance circuits 44, 46, which provide arc suppression across the relay contacts in well known fashion.

The contact 42c is connected directly to the emitter electrode 12a of the transistor 12 and also to the switch arm 66 of contact bank B of the stepping switch. Each of the six contacts a–f associated with switch arm 66 is coupled through an impedance element 72a–72f, respectively, and thence in common through resistor 76 to a slidable tap on the potentiometer 18. Any of the connections between the contacts in bank B and the resistor 76 may also include a condition responsive element such as 74, as will be explained in detail hereinafter. The contact 42d is unconnected and serves merely as a rest contact.

To illustrate the operation of the circuit, assume initially that six controlled devices are connected to the respective terminals 70a–70f, and it is desired to operate them all in sequence, each for a predetermined time. At the beginning of the cycle, the switch arms 64, 66 are on their associated a contacts, transistor 12 is not conducting between emitter 12a and base 12c, and the capacitor 14 is discharged. As operating potentials are applied, capacitor 14 commences charging from the power supply bus 13, through resistors 72a, 76, potentiometer 18, and the base-emitter circuit of transistor 22. During this time, the voltage on the base of the transistor 22 is sufficiently positive to render that transistor conductive, thereby lowering the potential at its collector electrode.

The collector potential on transistor 22 is applied directly to the base of transistor 26 and is sufficiently low to maintain the latter transistor nonconducting. The small voltage drop across the diode 28 maintains the potential on the emitter of the transistor 26 sufficiently positive with respect to ground so as to enable the collector potential of transistor 22 to maintain it in the cut off condition. With transistor 26 nonconducting, the relay coil 40, which forms its load impedance, is inoperative. Under starting conditions therefore, no conduction takes place between emitter 12a and base 12c of transistor 12, transistor 22 is conducting and transistor 26 is nonconducting.

With the relay coil 40 inoperative, the armature 42 is in its upper position as shown, coupling contacts 42a and 42b to each other and to ground. The D.C. supply 48 is thereby coupled through current limiting resistor 50 and contact 62a associated with the relay armature 62 to the relay coil 60, maintaining the latter operative. The stepping switch 66 preferably is of the type including a spring which is wound during actuation of the coil 60 and then released to step the switch arms 64, 66 to the next position upon deenergization of the coil. As will be explained hereinafter, the coil 60 is de-energized for a short interval at the beginning of each step to permit the switch to advance.

The transistor 12, in association with capacitor 14, the impedance elements 72a–72f and resistor 18, constitute an oscillator of the relaxation type whose frequency, or conversely, the spacing between consecutive pulses, is a function of the total resistance and capacitance in the network. Adjustment of the variable resistors 72a and 72b for example, will therefore be effective to control the time duration between consecutive advances of the switch 56. In the same way, the impedance element 72c, which may, for example, be a temperature-responsive device such as a thermistor, will also control the time interval in accordance with the temperature to which it is exposed. Similarly, the time intervals associated with each of contacts d, e, and f can be controlled by their associated variable resistors 72d, e and f.

The potentiometer 18 provides an overall timing adjustment which is superimposed on each of the individual settings determined by the elements 72a–72f. If desired, the resistor 20 may be a temperature-responsive element such as a thermistor, thereby being effective to control the operation in an overall manner dependent upon the temperature. Thus, the entire operational cycle may be automatically controlled in response to conditions, such as ambient temperature. For example, where the process being controlled involves viscous liquids, a temperature-responsive element 20 will correlate changes in viscosity due to heat with respect to the times of each of the individual steps of the process. Alternatively, the resistance 20 may if desired, be responsive to pressure, humidity, or any other condition which may affect the timing of the process steps.

Returning now to the starting conditions, with the switch arms 64 and 66 on their associated a contacts as shown, the capacitor 14 will charge up from the D.C. source 32 through potentiometer 18, resistor 76, variable resistor 72a, and the base-emiter circuit of transistor 22. In accordance with the foregoing discussion, the magnitude of the variable resistor 72a will be set to establish the desired time interval for operation of the controlled device coupled to terminals 70a. During the charging period, transistor 12 is nonconducting between its emitter 12a and its base 12c, and the relay armature 42 is in its upper position as shown. Therefore, the power source 80 is connected to actuate the controlled device coupled to terminals 70a.

After a time determined by the magnitudes of the aforementioned impedance elements, the charge on the capacitor 14 increases sufficiently to render the transistor 12 conductive. In the conducting condition, it provides a low impedance discharge path for the capacitor 14, and the rapid discharge of the latter generates a relatively short negative-going pulse which is supplied to the base of the normally conducting transistor 22, as shown in the figure. Transistor 22 is thereby rendered non-conductive, in turn rendering transistor 26 conductive.

With transistor 26 conductive, the relay coil 40 is operated to move the armature 42 to its lower position, bridging the contacts 42c and 42d. This opens the circuit through stepping switch coil 60, which deenergizes after a short delay due to its inductive characteristic, thereby permitting the contact arms 64, 66 to be stepped to their *b* contacts. At the same time, the armature 62 is released into position on contact 62*b*. It is noted that because of the short delay in the deenergization of the coil 60, the circuit from the power source to the controlled device is open (at contact 42*b*) prior to the stepping of the switch. Thus no power is being applied to the controlled device while switching occurs, eliminating arcing across the stepping switch terminals and markedly extending its life.

Actuation of the relay 40 also is effective, via contact 42*c*, to ground the emitter electrode 12*a* of the transistor 12 to the armature of the relay 42. This enables the charge on the capacitor 14 to be completely dissipated just prior to the initiation of the subsequent cycle. Each charging cycle of the capacitor 14 thus commences from the same voltage level, i.e. ground, insuring uniform and accurate operation of the pulse generator.

After a relatively short period established by the bias supplied to the base of transistor 22 through resistor 16, the transistor 22 again becomes conductive, cutting off the transistor 26. Relay 40 is again rendered inoperative and the armature 42 returns to its upper position, bridging contacts 42*a* and 42*b*. Power from the source 80 is now applied through the control device coupled to the contacts 70*b* and through the contact arm 64, which is now on its associated contact *b*, and thence to ground to complete the circuit.

As the armature 42 is initially released into its upper position, the armature 62 associated with the stepping switch coil 60 is on its contact 62*b*, thereby connecting the full D.C. supply current from 48 through the coil 60. For a short time therefore, full operating current is applied to the coil 60 and the stepping switch spring is wound in preparation for the next stepping cycle. However, after a relatively short time determined by the characteristics of the coil 60 and armature 62, the latter is moved to its contact 62*a*, inserting the current limiting resistor 50 into the supply line. This enables the coil 60 to maintain the stepping switch in its wound condition with a minimum of current, reducing power consumption and the possibilities of burn out.

With the switch arms 64 and 66 on their associated contacts *b*, the cycle as described above is repeated, the charging time of the capacitor 14 now being controlled by the magnitude of the resistor 72*b*. As will be understood, the circuit will sequentially repeat the cycle of operation until the switch 56 has stepped through all its available positions. The switch 56 may be arranged to return the arms to the *a* contacts and thus repeat the cycle indefinitely, or if desired, an additional open circuit contact may be provided to enable the circuit to shut itself off at the conclusion of the predetermined number of desired steps.

Many variations in the timing control are also possible by virtue of the manner in which the individual timing steps are established. For example, as indicated by the element 72*c*, the time duration of the step associated with the contact *c* may be made responsive to a condition, such as temperature, by employing a thermistor as the control resistance. Likewise, pressure, humidity, or other responsive elements may be used to determine the individual time intervals. If it is desired to omit a step of the process completely, the associated timing element 72*a* to 72*f* may simply be set to present zero resistance, whereby the charging time for the capacitor 14 is reduced effectively to zero. The circuit will thereby step to its subsequent position sufficiently rapidly to prevent operation of the associated controlled device.

Where the individual time of the process step is not predictable or determined by a detectable condition, but is dependent upon factors such as the extent of mechanical motion of a given apparatus, an individual time cycle may be suspended by the insertion of a suitable element such as a limit switch, indicated at 74, into the impedance network. If for example, the element 74 was a normally open limit switch closed in response to the attaining of a given position by a moving mechanical element, the charging circuit for the capacitor 14 would be opened when the arm 66 reached contact *b*. This would suspend operation of the circuit 10 until the limit switch was closed to complete the circuit. The associated variable resistor may either be adjusted to zero resistance, in which case the stepping switch would advance immediately upon closure of the limit switch, or it may be adjusted to provide a time delay after operation of the limit switch.

Adjustable resistor 16 provides additional flexibility to the control arrangement by permitting variation of the times between the termination of operation of one of the controlled devices and actuation of the succeeding device. The resistor 16 controls the bias on the base of transistor 22 and thus the duration of its nonconducting period during the discharge and charge cycle of the capacitor 14. Consequently, the length of time that coil 40 (in the collector circuit of transistor 26) is energized may be controlled. This in turn determines how long after the advance of the stepping switch, armature 42 is released to connect power to the controlled device. This additional adjustability feature is useful in various processes, for example, where the material or machine involved must be given time to cool between steps. If desired, the resistor 16 may be a condition responsive element, such as a thermistor, or be otherwise adjusted.

The use of a solid state or transistorized pulse generating circuit 10 enables control of apparatus requiring large amounts of power by a control circuit operating at relatively low voltage levels. The inherent long life and ruggedness of solid state networks minimize repair problems, and their compactness, reliability, and low heat dissipation enable the control arrangement to be mounted in relatively inaccessible locations directly on or near the apparatus being controlled. It will be realized of course that many forms of solid state timing networks other than the example illustrated will occur to those skilled in the art and may be useable in the present invention. It is necessary only that the specific circuit employed be capable of being controlled in the manner taught.

Furthermore, although a rotary stepping switch is illustrated as the sequential coupling device, it will be realized that any suitable form of sequentially operative multi-position switching means may be employed. This may take the form of a relay chain, for example, or be all electronic.

Many other modifications of the above-described invention will occur to those skilled in the art without departing from the spirit and scope thereof, and accordingly, it is intended that the invention be limited only as set forth by the appended claims.

We claim:

1. A variable timing circuit comprising, a solid state pulse generator of the relaxation oscillator type for providing a train of output pulses, an impedance network including a reactance element and a plurality of independently variable resistance elements for determining the output pulse spacing of said pulse generator, a potentiometer connected in common to all of said independently variable resistance elements, said potentiometer having resistance values relative to the resistance values of said independently variable resistance elements such that said potentiometer is effective to vary in the same proportion the output pulse spacings determined by each of said independently variable resistance elements, multiposition sequential switching means for coupling each of said independently variable resistance elements and said reactance element to said oscillator through a different position on said switching means, and means responsive to the output pulses of said pulse generator for actuating said switching means to advance one position for each pulse.

2. A variable timing circuit according to claim 1 wherein at least one of said independently variable resistance elements automatically adjusts in value in response to changes in a given condition.

3. A variable timing circuit according to claim 1 further comprising a resistive impedance which automatically adjusts in value in response to changes in a given condition connected in series with said potentiometer.

4. A variable timing circuit according to claim 1 further comprising a switch in circuit with at least one of said independently variable resistance elements, said switch being operable in response to an external stimulus.

5. Apparatus for controlling the timing and sequence of operations of a plurality of devices comprising, a source of power for actuating said devices, a solid state pulse generator of the relaxation oscillator type having its output pulse spacing determined by the constants of an impedance network forming a part thereof, said impedance network including a plurality of independently variable impedance elements, multi-position sequential switching means including at least two simultaneously operated sets of switching positions, means coupling each of said devices to said power source through a different switching position in one of said sets, means for inserting each of said impedance elements in said impedance network through a different switching position in another of said sets, and means responsive to each output pulse of said pulse generator for disconnecting said power source from said one set of switching positions for the duration of said pulse and actuating said switching means to advance one position while said power source is so disconnected, thereby simultaneously coupling a selected one of said devices to the power source and inserting one of said impedance elements into said network, said inserted impedance element controlling the duration of operation of said selected device.

6. Apparatus for controlling the timing and sequence of operations of a plurality of devices comprising, a source of power for actuating said devices, an adjustable impedance network, circuit means controlled by said impedance network for providing a series of output pulses, said impedance network including a plurality of independently variable impedance elements, means for varying the duration of said output pulses, multi-position sequential switching means including at least two simultaneously operated sets of switching positions, means coupling each of said devices to said power source through a different switching position in one of said sets, means for inserting each of said impedance elements in said impedance network through a different switching position in another of said sets, and additional switch means operable in response to each pulse from said circuit means to switch from a first position in which said power source is connected through one of said switching positions in said one set to its associated device to a second position in which said power source is disconnected from said device and said sequential switching means advances to its next position, said sequential switching means having a delayed operating characteristic to enable said additional switch means to switch to its second position prior to the advance of said sequential switching means to its next position, said additional means returning to its first position at the conclusion of each pulse.

7. Apparatus for controlling the timing and sequence of operations of a plurality of devices comprising, a source of power for actuating said devices, an adjustable impedance network, solid state circuit means controlled by said impedance network for providing a series of output pulses, said impedance network including a reactance element and a plurality of independently variable resistance elements, a stepping switch having two simultaneously operated sets of switching contacts, means coupling each of said devices to said power source through a different contact in one of said sets, means for inserting each of said variable resistance elements in said impedance network through a different contact in the other of said sets, and relay means operable in response to each pulse from said circuit means to switch from a first set of contact points coupling said power source through one of said contacts in said one set to its associated device, to a second position breaking the circuit between said power source and said device, enabling said stepping switch to advance to its next position, and connecting one terminal of said reactance element to ground, said stepping switch having a delayed operating characteristic to enable said relay means to switch to its second position prior to the advance of said stepping switch to its next position, said relay means returning to said first set of contact points at the conclusion of each pulse.

8. Apparatus for controlling the timing and sequence of operations of a plurality of devices comprising, a source of power for actuating said devices, an adjustable impedance network, solid state circuit means controlled by said impedance network for providing a series of output pulses, said impedance network including a reactance element, a plurality of independently variable resistance elements, and a potentiometer connected in common to all of said independently variable resistance elements, a stepping switch having two simultaneously operated sets of switching contacts, means coupling each of said devices to said power source through a different contact in one of said sets, means for inserting each of said independently variable resistance elements and said additional variable resistance element in said impedance network through a different contact in the other of said sets, and relay means operable in response to each pulse from said circuit means to switch from a first set of contact points coupling said power source through one of said contacts in said one set to its associated device, to a second position breaking the circuit between said power source and said device and enabling said stepping switch to advance to its next position, said stepping switch having a delayed operating characteristic to enable said relay means to switch to its second position prior to the advance of said stepping switch to its next position, said relay means returning to said first set of contact points at the conclusion of each pulse.

9. Apparatus for controlling the timing and sequence of operations of a plurality of devices comprising, a source of power for actuating said devices, an adjustable impedance network, a transistor oscillator of the relaxation type controlled by said impedance network for providing a series of output pulses, said impedance network including a capacitor and a plurality of independently variable resistance elements, a stepping switch having two simultaneously operated sets of switching contacts, means coupling each of said devices to said power source through a different contact in one of said sets, means for inserting each of said variable resistance elements in said impedance network through a different contact in the other of said sets, and relay means operable in response to each pulse from said transistor oscillator to switch from a first set of contact points coupling said power source through one of said contacts in said one set to its associated device, to a second position breaking the circuit between said power source and said device and enabling said stepping switch to advance to its next position, said stepping switch having a delayed operating characteristic to enable said relay means to switch to its second position prior to the advance of said stepping switch to its next position, said relay means returning to said first set of contact points at the conclusion of each pulse.

10. Apparatus for controlling the timing and sequence of operations of a plurality of devices comprising, a source of power for actuating said devices, an adjustable impedance network, circuit means controlled by said impedance network for providing a series of output pulses, the spacing between said pulses being determined by the constants of said impedance network, said impedance network including a reactance element and a plurality of independently variable resistance elements, a stepping switch having two simultaneously operated sets of switching contacts, means coupling each of said devices to said power source through a different contact in one of said sets, means for inserting each of said variable resistance elements in said impedance network through a different contact in the other of said sets, relay means operable in response to each pulse from said circuit means to switch from a first set of contact points coupling said power source through one of said contacts in said one set to its associated device, to a second position breaking the circuit between said power source and said device and enabling said stepping switch to advance to its next position, said stepping switch having a delayed operating characteristic to enable said relay means to switch to its second position prior to the advance of said stepping switch to its next position, and variable resistance means coupled to said circuit means and said relay means for controlling the length of time said relay means remains in said second position, said relay means returning to said first set of contact points at the conclusion of the time period established by said variable resistance means.

11. A variable timing circuit comprising, a solid state pulse oscillator for providing a train of output pulses, an impedance network including a reactance element and a plurality of individual resistance elements for determining the output pulse spacing of said pulse oscillator, additional impedance means coupled to said oscillator for controlling the width of the individual pulses of said train, multiposition sequential switching means for coupling each of said resistance elements in circuit with said reactance element and said oscillator through a different position on said switching means, and means responsive to the output pulses of said pulse oscillator for actuating said switching means to advance one position for each pulse.

12. Apparatus for controlling the timing and sequence of operations of a plurality of devices comprising, a source of power for actuating said devices, an adjustable impedance network including a plurality of individual impedance elements, a solid state pulse generator having its output pulse spacing determined by the constants of said impedance network, impedance means for controlling the duration of the individual output pulses of said pulse generator, a stepping switch having two simultaneously operated sets of switching contacts, means coupling each of said devices to said power source through a different contact in one of said sets, means for inserting each of said individual impedance elements in said impedance network through a different contact in the other of said sets, and additional switch means operable in response to each pulse from said pulse generator means to switch from a first position in which said power source is connected through one of said contacts in said one set to a second position in which said power source is disconnected from said device and said stepping switch enabled to advance to its next position, said additional switching means remaining in said second position for the duration of each pulse and thereafter returning to its first position.

13. A variable timing circuit comprising, a solid state pulse oscillator for providing a train of output pulses, an impedance network including a reactance element and a plurality of individual resistance elements for determining the output pulse spacing of said pulse oscillator, multiposition sequential switching means for coupling each of said resistance elements in circuit with said reactance element and said oscillator through a different position on said switching means, means responsive to the output pulses of said pulse oscillator for actuating said switching means to advance one position for each pulse, and means responsive to each of said pulses and operative during the application thereof for connecting said impedance network to a reference potential, whereby the first and all succeeding output pulse spacings for a given resistance element are substantially the same.

14. A variable timing circuit comprising, a solid state pulse generator of the relaxation oscillator type for providing a train of output pulses, an impedance network including a reactance element and a plurality of independently variable resistance elements for determining the output pulse spacing of said pulse generator, a potentiometer connected in common to all of said independently variable resistance elements, said potentiometer having resistance values relative to the resistance values of said independently variable resistance elements such that said potentiometer is effective to vary in the same proportion the output pulse spacings determined by each of said independently variable resistance elements, impedance means coupled to said pulse generator for controlling the width of the individual pulses of said train, multiposition sequential switching means for coupling each of said independently variable resistance elements in circuit with said reactance element and said pulse generator through a different position on said switching means, and means responsive to the output pulses of said pulse oscillator for actuating said switching means to advance one position for each pulse.

15. A variable timing circuit comprising, a solid state pulse generator of the relaxation type for providing a train of output pulses, an impedance network including a reactance element and a plurality of independently variable resistance elements for determining the output pulse spacing of said pulse generator, a potentiometer connected in common to all of said independently variable resistance elements, said potentiometer having resistance values relative to the resistance values of said independently variable resistance elements such that said potentiometer is effective to vary for varying in the same proportion the output pulse spacing determined by each of said independently variable resistance elements, impedance means coupled to said pulse generator for controlling the width of the individual pulses of said train, multiposition sequential switching means for coupling each of said independently variable resistance elements in circuit with said reactance element and said pulse generator through a different position on said switching means, means responsive to the output pulses of said pulse generator for actuating said switching means to advance one position for each pulse, and means responsive to each of said pulses and operative during the application thereof for connecting a point in said impedance network to a reference potential.

16. Apparatus for controlling the timing and sequence of operations of a plurality of devices comprising, a source of power for actuating said devices, an adjustable impedance network including a reactance element and a plurality of independently variable resistance elements, a solid state pulse generator of the relaxation oscillator type having its output pulse spacing determined by the constants of said impedance network, additional impedance means for controlling the duration of the output pulses of said pulse generator, a stepping switch having two simultaneously operated sets of switching contacts, means coupling each of said devices to said power source through a different contact in one of said sets, means for inserting each of said variable resistance elements in said impedance network through a different contact in the other of said sets, and relay means operable in response to each pulse from said pulse generator to switch from a first set of contact points coupling said power source through one of said contacts in said one set to its associated device, to a second position which breaks the circuit between said power source and said device, connects a point in said impedance network to a reference potential, and enables said stepping switch to advance to its next position, said stepping switch having a delayed operating characteristic to enable said relay means to switch to its second position prior to the advance of said stepping switch to its next position, said relay means returning to said first set of contact points at the conclusion of each pulse.

17. A variable timing circuit comprising, a solid state pulse oscillator for providing a train of output pulses, a network including a reactance element and additional impedance means for determining the output pulse spacing of said pulse oscillator, further impedance means coupled to said oscillator for controlling the width of the individual pulses of said train, multiposition sequential switching means for coupling said additional impedance means in circuit with said reactance element and said oscillator through different positions on said switching means, and means responsive to the output pulses of said pulse oscillator for actuating said switching means to advance one position for each pulse.

References Cited in the file of this patent

UNITED STATES PATENTS 2,444,210     Lauricella _____ June 29, 1948